Hill D. Wilson
INVENTOR.

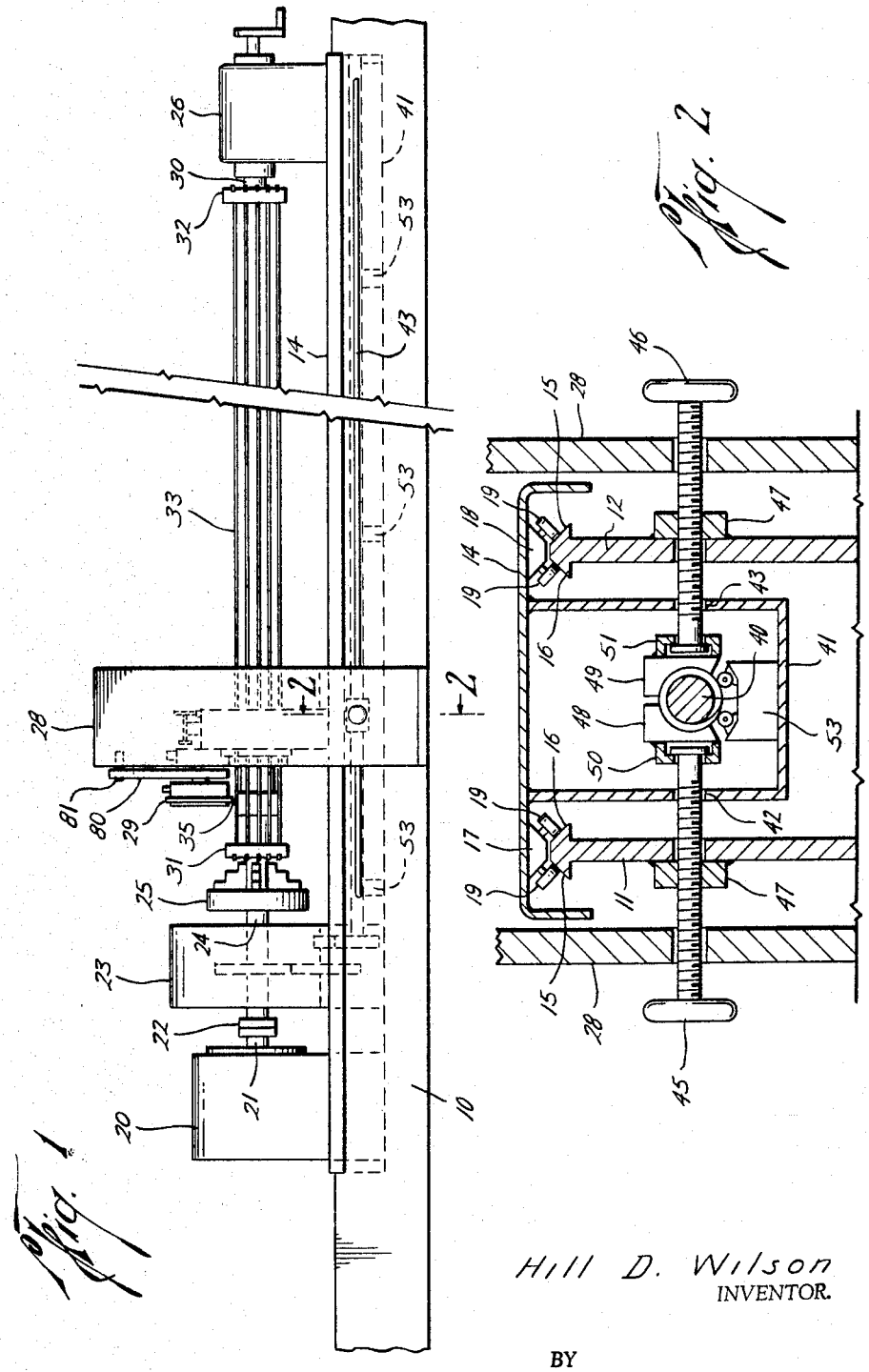

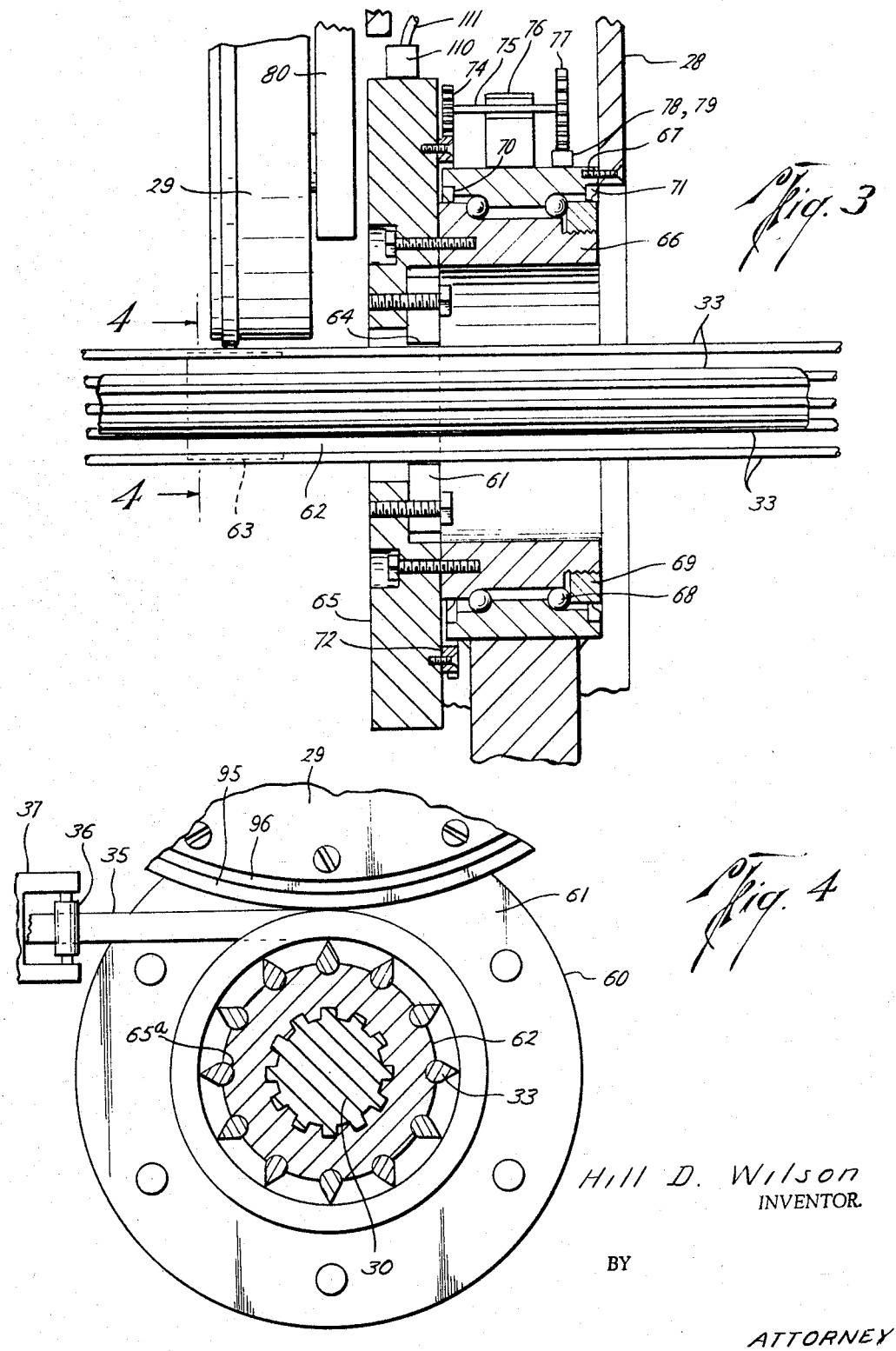

BY

ATTORNEY

United States Patent Office 3,275,785
Patented Sept. 27, 1966

3,275,785
METHOD AND APPARATUS FOR MANUFACTURING WELL SCREENS
Hill D. Wilson, 6122 Longmont, Houston, Tex.
Filed Oct. 17, 1963, Ser. No. 316,882
5 Claims. (Cl. 219—56)

This invention relates to the manufacture of basket-type well screens for oil wells or water wells. In this type of screen a wire is wound spirally around longitudinal ribs forming a long cylindrical screening element. At each point where the spiral wrapping crosses a longitudinal rib the two are joined together by resistance welding. This type of well screen is well known, having been on the market since about 1936. The present invention is an improved apparatus for simplifying and speeding up the manufacturing process.

It is the object of this invention to provide an improved apparatus wherein a mandrel formed of the longitudinal ribs, above mentioned, is formed, said apparatus having adequate support for the longitudinal ribs while the welding is taking place. The mandrel on which the longitudinal ribs are held is rotated and at the same time the wire is wound spirally there-around and as the wire is delivered onto the ribs the welding takes place at each required weld connection.

A further object of the invention is to provide such apparatus which is simple in use, dependable, and which makes the manufacture of well screens economical. Further, the well screens manufactured by this apparatus are more uniform and reliable than were well screens manufactured by older apparatus.

Briefly, the longitudinal ribs are supported parallelly along the length of the supporting mandrel, under some longitudinal tension. The mandrel is placed in a rotative machine, like a lathe, in a position disposed through a welding head. The wire forming the screen is fed onto the longitudinal ribs and the welding head includes an anvil which moves along so as to remain at all times beneath the point of feeding of wire onto the ribs. As the mandrel and longitudinal ribs rotate, the welding head welds each connection between wire and rib as it passes under the welding head. The welding head operation is timed so that a predetermined desired amount of electrical current passes from the welding head to the anvil for formation of each welding connection.

Other objects and advantages of the invention will appear from the following detailed description thereof, reference being made to the accompanying drawings, of which:

FIG. 1 is a broken side elevational view, showing some of the internal elements by a dashed line representation;

FIG. 2 is a partial vertical section taken at line 2—2 of FIG. 1;

FIG. 3 is an enlarged partial vertical cross-sectional view taken at the axis of the welding head and mandrel;

FIG. 4 is a partial enlarged vertical section taken at line 4—4 of FIG. 3;

Figure 5:
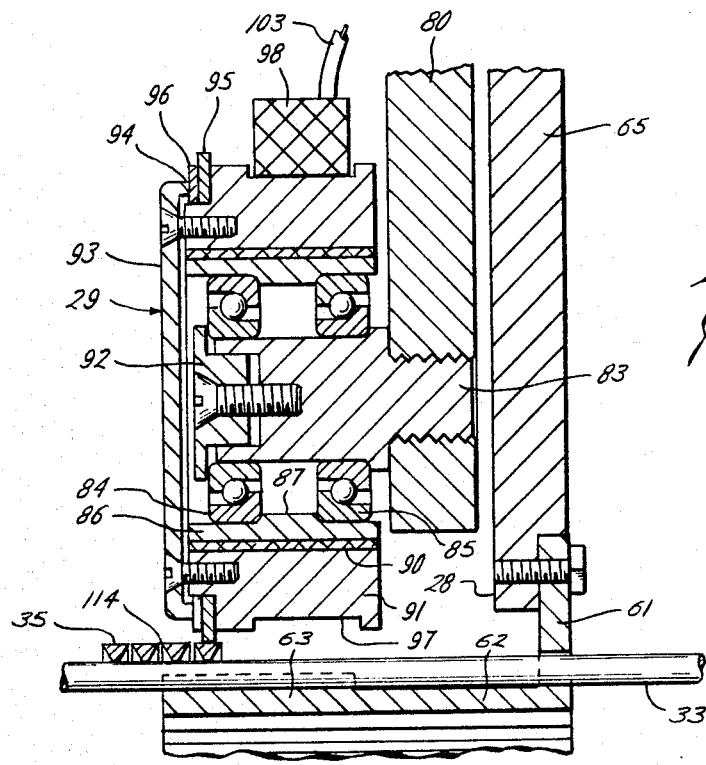
FIG. 5 is an enlarged partial vertical cross-section taken through the axis of the welding roller.

Referring first to FIG. 1 of the drawings, a base or support 10 is provided by two longitudinal vertically disposed parallel webs 11, 12 (see also FIG. 2). A carriage 14 is disposed upon the support and is movable lengthwise of the support. As shown in FIG. 2, the webs 11, 12, each have at their upper end a pair of longitudinally angular seats 15, 16. At the under side of carriage 14 there are provided corresponding roller supports 17, 18 from each angular side whereof are supported a plurality of aligned rollers 19, adapted to roll along the surfaces 15, 16. Carriage 14 has disposed thereon at one end an electric motor 20 the shaft 21 of which is coupled through a universal connection 22 to a gear box 23. Gear box 23 is of conventional design and adjust the speeds of the rotative members to be hereinafter described. Shaft 24 of gear box 23 supports a chuck 25. At the opposite end of the carriage 14 there is a tail stock chuck support 26. A welding head 28 is disposed above and to either side of carriage 14. The welding head supports a welding roller 29. The mandrel includes a splined shaft 30, the ends of which are supported respectively in chucks 25 and 26. Two flanges 31, 32 are supported at opposite end portions of shaft 30. The flanges 31, 32 may be moved to different positions on shaft 30. Thus, the well screen may be made of any selected length. The shaft 30 may be of any desired length.

A plurality of longitudinally and parallelly disposed rib members or bars 33 are stretched between the two flanges 31 and 32. Each rib or bar extends through an opening in each flange and is bent at its terminal ends to be held by the flange. A wire 35 (better shown in FIGS. 4 and 5) is affixed near one end of the longitudinal ribs 33 near the flange 31 and is drawn between a pair of rollers 36 carried by a fixed roller support 37, only one of the rollers 36 being shown in FIG. 4 of the drawing. Motor 20 acting through gear box 23 rotates the mandrel and longitudinal ribs 33 carried thereon so that the wire 35 is helically wrapped about the longitudinal ribs. A weld is formed by the welding roller 29 as each rib 33 is contacted by the wire 35.

Referring to FIGS. 1 and 2 of the drawing, the carriage 14 is moved along the supports 11, 12 by a lead screw 40 which is disposed within an under carriage housing 41 extending the length of the carriage. The lead screw is caused to rotate by connection with a gear of gear box 23 as shown in FIG. 1. Carriage portion 41 has at each side thereof a longitudinal slot 42, 43. Beneath the welding head 28, a pair of bolts 45, 46 are threadedly engaged through nuts 47 welded to the outer side of suitable openings through the members 11, 12. The bolts 45, 46 extend through their threaded connections with bushings or nuts 47 through the respective members 11, 12 and slots 42, 43 to have affixed at their inner ends the nut sections 48, 49. Nut sections 48, 49 are affixed to the bolts by free fitting connections 50, 51, respectively, so that the nut sections 48, 49 do not rotate when the bolts are screwed in or out of the bushings 47, 47. When nut sections 48, 49 are withdrawn from contact with lead screw 40, the rotation of the lead screw does not cause movement of the carriage longitudinally of supports 11, 12. When the nut sections 48, 49 are brought together to contact lead screw 40, the lead screw being affixed to the carriage, the carriage is caused to move longitudinal of the supports. In order to prevent sag of the lead screw, a plurality of roller supports 53 are disposed on the lower floor of carriage section 41 to bear against the lower side of the threaded lead screw. Since the nut sections 48, 49 do not cover the lower surface of the lead screw, the rollers are free to rotate on the lower portion of the lead screw so that it will not sag and become misaligned.

Referring now particularly to FIG. 3 of the drawings, and also to the other figures from time to time, at the time that the longitudinal ribs 33 are placed along the mandrel, a welding anvil is disposed outside of shaft 30 and interiorly of the ribs. The welding anvil is secured against rotation on shaft 30 by the splines. The welding anvil 60 has a flange portion 61 from which extend concentrically a hub portion 62 having an enlarged anvil portion 63. The anvil portion 63 lies against the inside surface of the ribs 33. The anvil 60 may be slidingly moved longitudinally of the mandrel and ribs. The ribs extend through openings 64, provided in the same plurality as the number of ribs, and lie in the slots 65 in the anvil portion 63 of the anvil member 60, which provides support at the time of welding. The ribs are of teardrop cross-section as shown in FIG. 4. The flange 61 is screwed as shown in FIG. 3 to a disc 65a which rotates with the anvil. Rotation of the anvil is caused by rotation of the rib mandrel, as will be apparent. Disc 65 is screwed as shown in FIG. 3 to a hub member 66 which is disposed for rotation within another hub member 67 which forms a part of welding head 28. Welding head 28 is interiorly hollowed as shown in FIGS. 1 and 3 in order to receive the internal elements. The bearings 68 which provide low friction rotation of members 66 within members 67 are retained by retainer ring 69. Seals 70, 71 are provided to prevent dirt from entering the bearing areas. A gear ring 72 is screwed to one side of disc 65 which is at the same side of disc 65 as members 66, 67. A gear 74 mounted on a shaft 75 supported by pillow block bearing 76 is rotated as disc 65 rotates to rotate ring gear 72. This causes rotation of commutator ring 77 which is mounted at the opposite end of shaft 75. A pair of contact brushes 78, 79 supported by and in contact with member 67 which forms a part of welding head 28. The operation of commutator ring 77 will be later explained.

Referring to FIGS. 1, 3 and 5 of the drawings, the welding roller 29 is supported rotationally at the end of an arm 80 which is pivotally mounted at its opposite end at pin 81 on a side of welding head 28. Pin 81 is threaded at one end which is screwed into a tapped opening of head 28. Arm 80 can pivot on pin 81. A hub member 83 is screwed into a tapped opening in the free end of arm 80. Ring ball bearings 84, 85 are disposed around hub member 83 and a cylinder 86 inwardly upset at 87 is engaged with the outer bearing surfaces. An insulating sleeve 90 electrically separates the welding roller cylinder 91 which is disposed therearound. A flanged member 92 screwed to the end of member 83 retains the bearings 84, 85 in place. A cover plate 93 having peripheral flange 94 is screwed to welding roller cylinder 91 to retain welding ring 95 and retainer ring 96. As is best shown in FIG. 4, the welding ring 95 contacts the wire 35 over a rib 33 during formation of each weld. Welding roller cylinder 91 has an external annular recess 97 in which contact is made by a brush contact 98.

Figure 6:
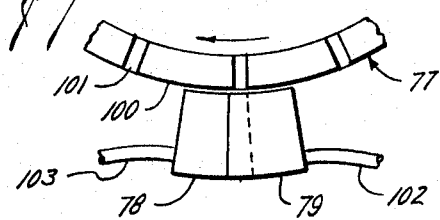
FIGS. 6, 7 and 8 are schematic views showing operation of the timing means for timing the welding cycle.
Figure 8:
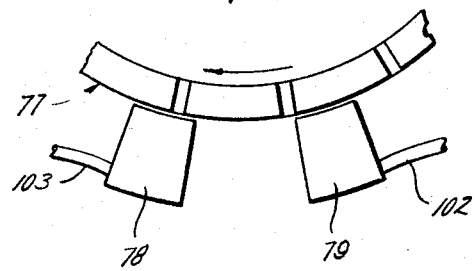
Figure 7:
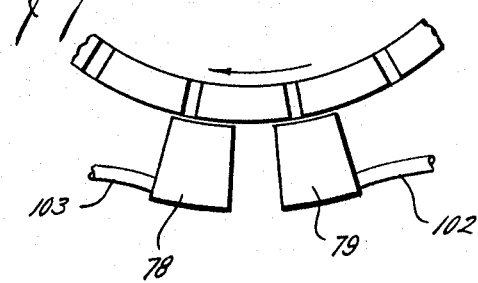

Referring to FIGS. 6–8 of the drawings, a portion of the commutator ring 77 is shown in each of these figures of the drawings. The commutator ring has a plurality of contact elements 100 therearound spaced apart by the spaces 101. The contact brushes 78, 79 are disposed by means, not shown, for movement to positions wherein these brushes are spaced either overlappingly as shown in FIG. 6 or at an adjustable distance apart as shown in FIGS. 7 and 8. Upon rotation of commutator ring 77 by ring gear 72 and gear 74 acting through shaft 75, current flows through lead 102 connected to brush 79 thence across one of the elements 100 and thence to the other brush 78 and out through lead 103 connected therewith. The leads 102, 103 are, of course, electrical leads. Lead 102 is connected from a welding transformer (not shown) which supplies suitable electrical power for forming the welds. Current can flow between brushes 78, 79 only when these brushes are both in contact with one of the elements 100. Therefore, when the brushes 78, 79 are close together as shown in FIG. 6, the current flow duration is relatively long since both brushes are in contact with any given element 100 for a substantially maximum period of time. On the other hand, in the placement of brushes 78, 79 shown in FIGS. 7 and 8 the current duration is shorter because both brushes 78, 79 are in contact with a single element 100 for a shorter period of time. The rotation of commutator ring 77 is constant so that the duration of the welding current for formation of a single weld may be controlled by movement of the brushes as indicated.

Electrical lead 103 is connected to brush 98 as shown in FIG. 5. Thus, the current passes from brush 78 through lead 103 to brush 98 and thence to the welding roller.

Brush 110 contacts disc 65 and is connected to the ground of the welding transformer (not shown) by an electrical lead or conductor 111.

The speeds of rotation of chuck 25 and shaft 40 are established and adjusted by gear box 23 such that welding current output between welding ring 95 and anvil portion 63 occurs each time the wire 35 comes into contact with each successive rib 33 as the ribs are rotated with the mandrel and as additional wire is wound helically about the ribs. Since the carriage moves at constant speed, from right to left in FIGS. 1, 3 and 5, the rollers 36 (FIG. 4) being in a fixed location, the spacing 114 (FIG. 5) between the helical loops of wire 35 is very accurate and uniform throughout the length of the well screen. This spacing may be altered as desired by changing the speed of rotation of shaft or lead screw 40 with respect to the speed of rotation of splined shaft 30, so that movement of the carriage longitudinally is changed with respect to rotational movement of the ribs 33. Thus, a coarser or finer mesh screen may be readily manufactured, as desired.

The tear drop cross-sections of ribs 33, and the "keystone" cross-section of wire 35, as shown, reduce the contact areas at the welds, so that welding current requirements are reduced. Commutator 77 and its speed of rotation, and the spacing and size of brushes 78, 79 are adjusted by proper ratios of ring gear 72 and gear 74 so that the welding current flows only during each successive contact of wire 35, with a rib 33 for a sufficient time to form an adequate weld.

It will be clear that the well screen will be continously formed, under consistent control, from end to end, without movement of the welding head and the associated large welding transformer. Thus, the operation is simplified and made less cumbersome and costly through proper application of this invention. The length of the apparatus can be as desired so that well screens of any length can be made. Well screens up to 50 feet in length, and even longer, can be made. By moving flange 32 on shaft 30, the length of the screens may be made longer or shorter on any given size of machine.

The size of the portions 62, 63 of the anvil may be altered to make screens of different diameters. Since the welding roller is pivotally mounted, the roller position moves to adapt to the different diameters.

The rib spacings can be selected and changed as desired by appropriate gear selection to adapt the welding timing in conformity therewith.

After a screen has been completed, the carriage is easily and quickly moved back in preparation for commencement of manufacture of another screen by loosening of bolts 45, 46 to disengage nut sections 48, 49 from lead screen 40, so that the carriage may be moved manually to the starting position.

While a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. Apparatus for manufacturing well screens, comprising mandrel means comprising an axial shaft having spaced flanges thereon for supporting a plurality of circumferentially spaced parallel longitudinal metal ribs about a common axis, said ribs extending between said flanges spaced outwardly of said shaft, means for rotating said ribs about said axis, means for moving said ribs longitudinally during said rotation thereof, fixed means for winding metal wire means helically about said ribs while said ribs are moving longitudinally and rotating, longitudinally fixed anvil means coaxial with axis and rotatable with said ribs in contact with the inner side of each rib, welding head means contacting said wire at each contact thereof with a rib during said winding thereof, and means for supplying electric current between said head means and anvil and through said wire and rib at each point of contact therebetween, said shaft being splined, said anvil having a portion engaged with said splines and slidingly contacting the inner sides of said ribs and having a portion extending exteriorly of said ribs and being electrically grounded.

2. Combination of claim 1, said rib moving means comprising a carriage longitudinally movably supported on parallelly disposed track means; said carriage supporting drive means, gear means for simultaneously driving said mandrel and said carriage, and means for supporting each end of said shaft.

3. Combination of claim 2, said carriage having a longitudinal rotatable lead screw supported therealong, nut means carried on said track means releasably engaging said lead screw, said gear means rotating said lead screw, whereby said carriage is driven longitudinally when said nut means is engaged with said lead screw.

4. Combination of claim 3, said electric current supply including rotative commutator means comprising spaced circularly disposed conducting elements, a pair of spaced brush means contacting each conducting element simultaneously during spaced welding current flow intervals, the spacing of said brush means being adjustable to adjust the duration of said intervals, said commutator being rotated at a speed whereby a welding current flow interval occurs when said welding head passes over each rib-wire contact.

5. Combination of claim 4, said welding head including pivotally mounted roller means providing electrical contact with said wire.

References Cited by the Examiner

UNITED STATES PATENTS

| | | | |
|---|---|---|---|
| 1,183,196 | 5/1916 | Heany | 219—115 |
| 1,365,015 | 1/1921 | Zwicker | 219—56 |
| 1,585,905 | 5/1926 | Madden et al. | 219—56 |
| 2,046,460 | 7/1936 | Johnson | 219—56 |
| 2,327,686 | 8/1943 | Williams | 219—56 |

FOREIGN PATENTS 525,485  8/1940  Great Britain.

RICHARD M. WOOD, *Primary Examiner.*

B. A. STEIN, *Assistant Examiner.*